United States Patent [19]

Mlynarik et al.

[11] 4,314,690

[45] Feb. 9, 1982

[54] HYDRAULIC APPARATUS FOR THE GENERATION OF LARGE TENSILE FORCES

[75] Inventors: Jan Mlynařík; Josef Novák; Jiří Gregor, all of Plzeň, Czechoslovakia

[73] Assignee: Skoda, oborovny podnik, Plzeň, Plzeň, Czechoslovakia

[21] Appl. No.: 89,898

[22] Filed: Oct. 31, 1979

[30] Foreign Application Priority Data

Oct. 31, 1978 [CS] Czechoslovakia .................... 7083-78

[51] Int. Cl.[3] ........................ B23P 11/02; E21B 19/00

[52] U.S. Cl. .................................. 254/29 A; 81/57.38

[58] Field of Search ........................ 254/29 A, 93 HP; 269/22; 29/452; 81/57.38

[56] References Cited

U.S. PATENT DOCUMENTS 3,924,843 12/1975 Hirmann .................... 254/93 HP X 4,120,230 10/1978 Bunyan ........................ 254/29 A X

*Primary Examiner*—Robert C. Watson

*Attorney, Agent, or Firm*—Klein & Vibber

[57] ABSTRACT

Hydraulic apparatus for the generation of large tensile forces by means of a number of stacked power units, each having a hydraulically energized power cell, the stack of units being disposed in alignment with the member to be stressed. The power cells are connected and parallel, in their surfaces rest against supporting plates which provide a clearance therebetween so as to permit an expansion of said cells when they are subjected to hydraulic pressure. A similarly supported return cell causes the power cells to return to their initial positions when hydraulic pressure is removed from them.

4 Claims, 5 Drawing Figures

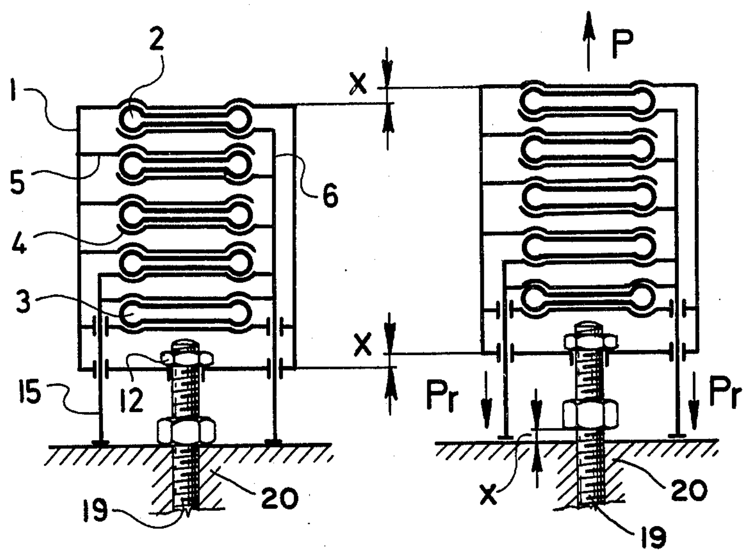
FIG. 3
FIG. 4
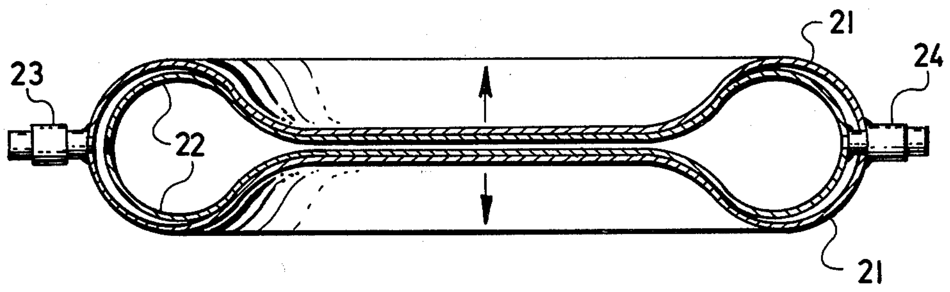
FIG. 5

HYDRAULIC APPARATUS FOR THE GENERATION OF LARGE TENSILE FORCES

BACKGROUND OF THE INVENTION

The invention relates to an apparatus for the generation of large tensile forces, for instance for pre-stressing screw bolts of pressure vessels of nuclear reactors, of turbine bodies and pump bodies, for the pre-stressing of cables, and for the stressing of various machine parts.

An apparatus for this purpose which is presently used generates the pre-stressing force by means of one or more hydraulic cylinder pistons connected in parallel. These cylinders and pistons are arranged either coaxial of the screw bolt to be stressed, or circumferential of the axis of the screw bolt. The resulting force acts upon an auxiliary nut fixed above them on the end of the screw bolt which extends from a support.

Such prior apparatus has a number of disadvantages. The active surface of the pistons and the working pressure of the pressure medium determine the required tensile force. The lack of space determined by the spacing of the screws, however, limits the diameter of the working pistons when such pistons are arranged coaxial of the screw, and limits the diameter and number of pistons with the arrangement wherein a plurality of pistons are disposed on a circle coaxial with the screw. Thus the resulting force is also limited, and can be increased only by increasing the working hydraulic pressure. In this case, however, problems with the packing of the working pistons and the pressure source increase. In the case of a coaxial arrangement, it is possible to increase the force by increasing the number of pistons connected in parallel; however, with this arrangement problems with packing and number of packing locations also increase. Another drawback of the prior art is that the auxiliary nut, against which the pistons or cylinders rest, is disposed on the prolonged bolt of the screw above the pistons or cylinders, and the prolonged screw bolt passing through the center of the pistons or cylinders. Thus such arrangement occupies a considerable part of the available working surface of the pistons, thereby eliminating the resulting working tensile force.

SUMMARY OF THE INVENTION

The present invention has among its objects the provision of a hydraulic apparatus for generating large tensile forces which overcomes the above outlined difficulties in prior arrangements. According to the invention, a system of hydraulic power cells is disposed in a supporting body above the part to be stressed, each of such power cells resting with its surface both against a lower supporting plate and against an upper supporting plate. All of the lower supporting plates are mutually linked by connecting bodies, and all upper supporting plates engage annular cylindrical circumferential parts. A clearance is left between each upper supporting plate and the lower supporting plate of the next adjacent power unit. Compressive force is transmitted from the stacked power units by means of plungers passing through the supporting body and abutting an auxiliary body which is disposed upon the support for the member to be stressed. At least a single return hydraulic cell is provided in the supporting body, such return cell resting with its surfaces both against a lower supporting plate which in turn rests upon the supporting body, and against an upper supporting plate which rests against the lower supporting plate of the stacked system of power units, whereby a clearance is provided between the lower and upper supporting plates of the return cell.

An advantage of the apparatus of the invention is that for a given diameter of power cells, limited by the distance of the screw bolts to be stressed and by the pressure of the hydraulic pressure medium, it is possible to obtain the required force for pre-stressing by connecting a required number of single or multi-shell power cells in parallel. As the power cells are disposed above the end of the pre-stressed member, for instance, above a screw bolt, and the pre-stressed part does not pass through the center of the power cells, it is possible to utilize 100% of the active services of the diaphragms of the power cells and thus to utilize the available space more advantageously than is possible with presently used arrangements.

Furthermore, the arrangement of the invention permits the use for the auxiliary nut on the same thread as that employed by the main nut on the bolt, and thus to reduce the overall length of the screw bolts. Any packing of mobile units is eliminated, thus also eliminating losses due to friction of packings, leakages of the pressure medium due to looseness of the moving parts such as pistons moving in cylinders, problems with maintenance of packings, and reducing problems as to maintaining the cleanliness of the pressure medium. This is of great importance in the case of a large number of power units, for instance, when simultaneously tightening the screw connections of a cover of a nuclear reactor. The manufacture of a number of exactly and cleanly worked surfaces of hydraulic pistons and cylinders is also eliminated.

The power cells can be manufactured by simple technology, as by die pressing, which is particularly suitable for mass production. When using multi-shell power cells, it is possible to increase the working hydraulic pressure employed therewith and thus the resulting force proportionally to the number of shells employed in a power cell, while maintaining the advantages outlined above. In that case, a special device has to be used for building up pressure in the individual shells—a pressure divider—which feeds the individual shells from a single pressure source with a prior selected ratio of pressures. It is also possible, by means of the return cell and the auxiliary nut, to increase the stroke of the apparatus several times. An apparatus thus constructed permits an easy, quick, simultaneous and uniform tightening or loosening of nuts of heavily stressed screw connections.

DESCRIPTION OF THE DRAWINGS

Exemplary embodiments of hydraulic apparatus for generating large tensile forces according to the invention are shown in the attached drawings, in which:

FIG. 3 is a diagrammatic view of the apparatus with the parts in the positions thereof shown in FIG. 1;

FIG. 4 is a view similar to FIG. 3 of the apparatus with the power cells subjected to hydraulic pressure whereby to prestress a bolt; and FIG. 5 is a view in diametral section of a twin shell power cell which may be employed in the power units of the present invention.

DESCRIPTION OF PREFERRED EMBODIMENTS

Figure 1:
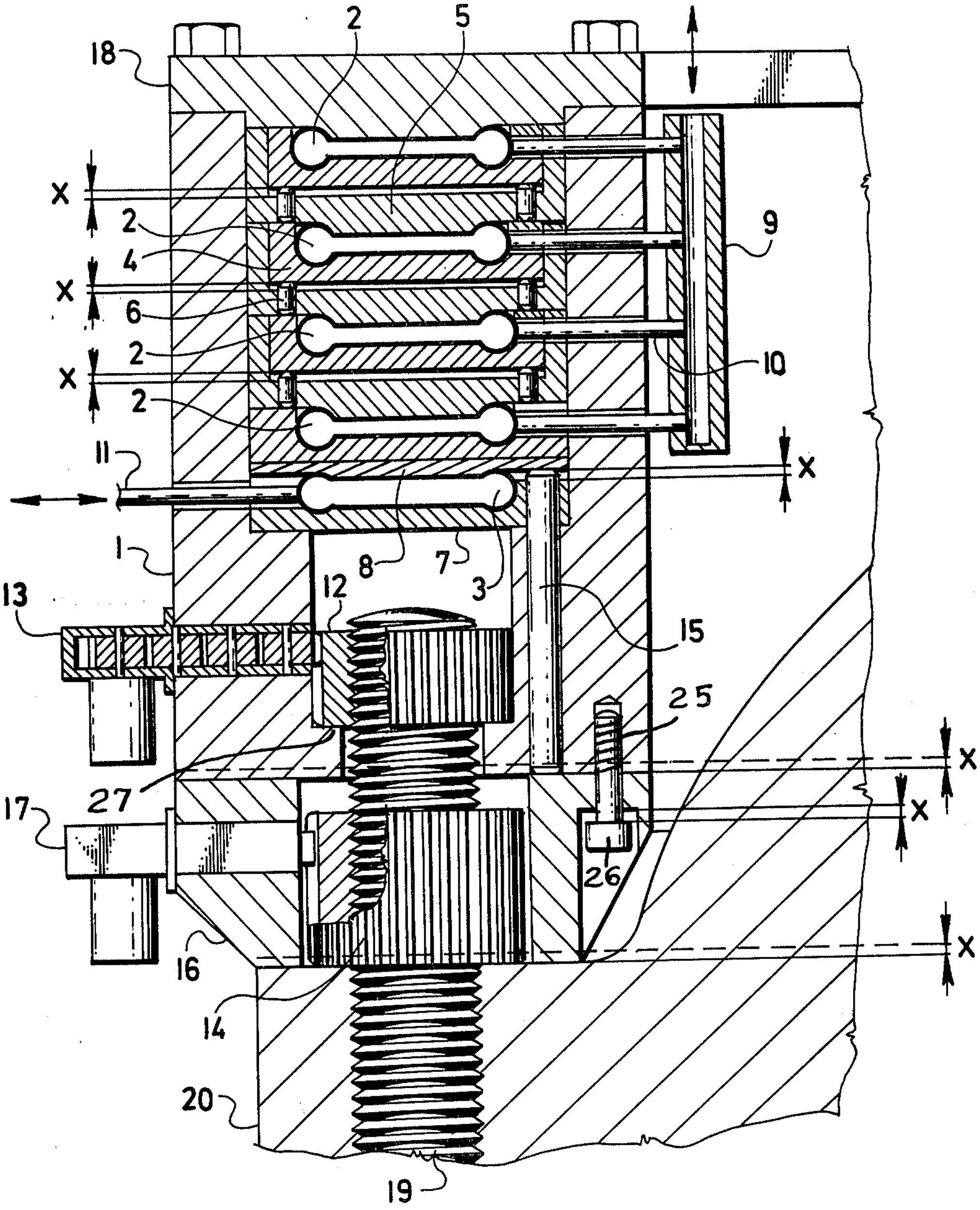
FIG. 1 is a view partially in section and partially in elevation of the entire hydraulic apparatus with the parts in the positions which they assume when the power cells are not subjected to hydraulic pressure.

Referring first to FIGS. 1 and 3, which show the apparatus in its unstressed or at rest condition, a plurality (four shown) of metal power cells 2 and one or more (one shown) return cells 3 are disposed one above the other in a stack in the cavity of a hollow supporting body or housing 1 coaxial with a screw bolt 19 to be stressed. The housing 1 can be arranged as an independent part for each screw bolt 19, or it may be common to the apparatus employed for the stressing of a plurality of bolts 19. Each power cell 2 is arranged between a lower supporting plate 4 and an upper supporting plate 5, each power cell 2 with its respective upper and lower supporting plates constituting a power unit. The lower supporting plates 4 are connected for the transmission of compressive forces therebetween by pins 6 which slide in openings in the upper plates 5, the upper ends of the pins engaging the lower surface of the lower plates and the lower ends of the pins 6 engaging the lower plates of the next adjacent power unit. An axial clearance x is created between the lower supporting plates 4 and the upper supporting plates 5, said clearance being equal to the required stroke of the apparatus in the case of stressing.

A return cell 3 is also disposed in the cavity in the housing 1, cell 3 resting against a lower supporting plate 7 and an upper supporting plate 8. The internal space within the power cells 2 is supplied from a pressure medium from a common distributor 9. The connections 10 between the distributor 9 and the power cells 2 are flexible so as to permit relative motion between the power cells of the lower supporting plates 4 and the upper supporting plates 5 with respect to the housing 1. The distributor 9 is connected to a pressure source (not shown). The return cell 3 is fed with a hydraulic pressure medium through a conduit 11.

As above noted, a screw bolt 19 to be stressed is threadedly mounted in the flange 20 of a support and projects outwardly therefrom. An auxiliary nut 12 is screwed onto the upper end of bolt 19, nut 12 being in the form of a gear adapted for engagement with a pinion constituting the outer one of a gear train disposed within a housing 13. The gear train and the driving means (not particularly shown) connected thereto permit the auxiliary nut 12 to be adjusted relative to the length of the bolt 19. The main nut 14, also in the form of a gear, is similarly adjusted by a means 17.

The lower part of the housing 1 rests upon an auxiliary body 16 provided with a recess for the main nut 14. The auxiliary body 16 can be an independent part of the apparatus or it can alternatively can be connected with the supporting body 1 by a plurality of machine screws 25 having heads 26, as shown, the machine screw head 26 being disposed beneath the flange of bodies 16 in FIG. 1 so as to be spaced therefrom by a distınce x. In the embodiment shown, the housing 1 is closed by a cover 18 which serves as an abutment engaged by the upper diaphragm of the uppermost power cell 2.

Figure 2:
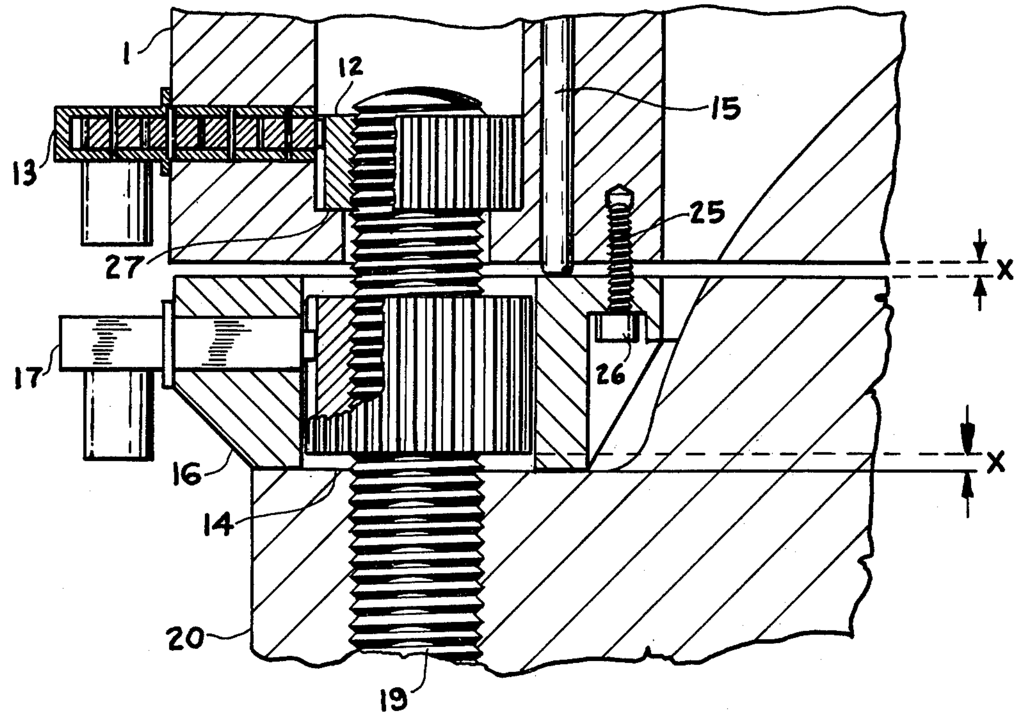
FIG. 2 is a fragmentary view of the apparatus of FIG. 1 showing parts of the apparatus of FIG. 1 showing parts of the apparatus cooperating with the outer end of the member being stressed when the power cells of the apparatus are subjected to hydraulic pressure.

As shown in FIGS. 2 and 4, when the power cells 2 are subjected to hydraulic pressure, the length of the stack of power cells increases by reason of the deflection of the upper and lower diaphragms of each cell away from each other. The upper end of the stack of power cells 2, when subjected to hydraulic pressure, acting through the cover 18 and the body of the housing 1, cause the flange 27, which projects inwardly from the lower end of the housing 1 beneath the auxiliary nut 12, to pull the auxiliary nut upwardly. The lower end of the stack of power cells 2, acting through the plungers 15 and the auxiliary body 16 which rests upon support 20 to thrust the lower end of the bolt 19 being stressed downwardly. In other words, the portion of the bolt 19 shown in FIG. 1 is stretched to elongate it through a distance x by means subjected to a large tensile force exerted between the support 20 and the auxiliary nut 12. The distance x is limited by engagement of the heads 26 of each of the machine screws 25 with the flange on the auxiliary body 16, as shown in FIG. 2.

In greater detail, the apparatus of the invention operates as follows: In FIG. 1 the parts of the apparatus are shown in their initial positions, ready for stressing. The return cell 3 is extended through a distance x, the power cells 2 being compressed through the distance x. The apparatus is mounted on the screw bolt 19, on which the main nut 14 has been screwed. By means of a drive 13 the auxiliary nut 12 is screwed on the projected portion of the screw bolt 19. The feeder 11 of the return cell 3 is connected to fluid discharge means such as a sump. The inlet to the distributor 9 is connected to the source of hydraulic pressure. By the extension of the power cells 2, the supporting body 1 is urged upward and acts through the shoulder or flange on its lower end through the auxiliary 12 to produce a force P on the screw bolt 19 until the maximum force is achieved or the maximum stroke x of the arrangement is reached. The reaction Pr of the force P is transmitted via plungers 15 and the auxiliary body 16, for example, to the cover 20 of a pressure vessel.

In the course of this operation, the return cell 3 is compressed through the value x and the pressure medium contained therein is forced to flow to the sump. The main nut 14 is thereafter tightened through the clearance x thus obtained between the main nut 14 and the cover 20 of the pressure vessel. After tightening the main nut 14, the inlet to the distributor 9 is connected to the sump or waste, and the feeder 11 of the return cell 3 is connected to the source of the pressure medium. The diaphragms of the return cell 3 are thus extended through the distance x and the diaphragms of the power cells 2 are compressed through a distance x, the pressure medium in cells 2 being forced out of them into the waste. After this operation, the arrangement is again in its initial rest period ready for further application. This cycle can be repeated several times and thus the overall stroke of the arrangement can be increased. This is of particular advantage in some special cases, for instance in case soft packing is used, if elastic screw bolts are used, or the like. In the same way, the arrangement can be used for the loosening of screw bolts.

In FIG. 5 there is shown a twin shell in section. Each shell, the external shell 21 and the internal shell 22, is composed of two similar pressings, welded on the circumference. The pressurizing of the external shell 21 is accomplished via a welded-on net 23. A welded-on neck 24 serves for pressurizing the internal shell 22. The pressure in the space of the internal shell 22 is always twice the pressure in the space of the external shell 21. The spaced parallel diaphragms of the shell extend or expand in opposite directions, as indicated by the arrows, when the internal and external shells are subjected to hydraulic pressure. As above indicated, shells made in accordance with FIG. 5 may be substituted for those shown in FIGS. 1-4, inclusive.

Although the invention is illustrated and described in reference to a plurality of preferred embodiments thereof, it is to be expressly understood that it is in no way limited to the disclosure of such a plurality of preferred embodiments, but is capable of numerous modifications within the scope of the appended claims.

We claim:

1. A hydraulic apparatus for the generation of large tensile forces, comprising a housing having a cavity therein, a plurality of expansible, compressive force generating units disposed in the cavity of the housing in stacked relationship, each of said units comprising an expansible power cell having spaced first and second diaphragms connected by a circumferential edge closure so as to present a closed space therewithin, a first plate engaging the first diaphragm of the power cell, a second plate engaging the second diaphragm of the power cell, the second plates of the successive units being disposed parallel and spaced from each other in said stack of units, first plungers disposed between the successive second plates of the units to transfer compressive forces therebetween, a support, means to connect an elongated member to be subjected to tension to said support with a portion of said member projecting from the support, means presenting a flange on the outwardly projecting portion of the member, means on the housing engaging the axially inward circumferential surface of said flange on the member, a plurality of second plungers slidably disposed in the housing in alignment with the stack of power units, said second plungers exerting compressive forces from the second plate of the power unit disposed nearest said support upon the support, and means for subjecting the spaces within the cells of the units to fluid pressure, whereby to subject the housing and the support to a force which urges them apart and subjects the elongated member to tension.

2. The apparatus of claim 1, comprising a further unit disposed in said stack of units for subjecting the power cells of the power units to compression after fluid pressure has been released from the spaces within the power cells of the power units, said further unit comprising a cell having spaced parallel diaphragms connected by circumferential edge sealing means to present a space therewithin, said further unit having a first plate overlying a first diaphragm thereof and a second plate parallel thereto and overlying the second diaphragm thereof, the ends of the second plungers remote from the support passing through openings in the second plate of the further unit into abutment with a portion of the first plate thereof so as to transmit compressive force from the second plate of the power cell in the stack which overlies and abuts the first plate of the further unit, and means for selectively subjecting the space within the cell of the further unit to fluid pressure.

3. The apparatus of claim 1, comprising an auxiliary body which is interposed between the support and the housing, and wherein the ends of the second plungers nearer the support engage the auxiliary body and transmit compressive force from the stack of power units to the support through the auxiliary body.

4. The apparatus of claim 1, wherein the member to be subjected to tensile force is a screw, and the means presenting a flange thereon is a nut adjustably positioned on the projecting, outer end of the screw.

* * * * *